US012741815B2

(12) United States Patent
Sun et al.

(10) Patent No.: US 12,741,815 B2
(45) Date of Patent: Sep. 22, 2026

(54) INTELLIGENT LIFTING SHUTTLE CARRIER STEREOSCOPIC WAREHOUSE FOR FLOAT GLASS

(71) Applicant: Nanjing Light Industrial Machinery Packaging Co, LTD., Nanjing (CN)

(72) Inventors: Qi Sun, Nanjing (CN); Limin Hao, Nanjing (CN); Jianfeng Gu, Nanjing (CN)

( * ) Notice: Subject to any disclaimer, the term of this patent is extended or adjusted under 35 U.S.C. 154(b) by 259 days.

(21) Appl. No.: 18/755,699

(22) Filed: Jun. 27, 2024

(65) Prior Publication Data

US 2024/0343491 A1 Oct. 17, 2024

(30) Foreign Application Priority Data

Apr. 17, 2024 (CN) ......................... 202410462303.9

(51) Int. Cl.
*B65G 1/137* (2006.01)
*B65G 1/04* (2006.01)

(52) U.S. Cl.
CPC ......... *B65G 1/1371* (2013.01); *B65G 1/0485* (2013.01); *B65G 1/0492* (2013.01); *B65G 2203/0216* (2013.01)

(58) Field of Classification Search
CPC .. B65G 1/1371; B65G 1/0485; B65G 1/0492; B65G 2203/0216
USPC ........................................ 700/213, 214, 215
See application file for complete search history.

(56) References Cited

U.S. PATENT DOCUMENTS 10,351,346 B2 * 7/2019 Otto ..................... B65G 1/0492
11,772,904 B2 * 10/2023 Sun ........................ B65G 15/42
198/373

* cited by examiner

*Primary Examiner* — Khoi H Tran

(57) ABSTRACT

An intelligent lifting shuttle carrier stereoscopic warehouse for float glass includes an inbound rotary table, a lifting shuttle carrier system, a shelf system, an outbound rotary table and a stereoscopic warehouse management system. The lifting shuttle carrier system includes a mobile vehicle, the mobile vehicle includes a frame unit, the frame unit includes a first frame and a second frame, a driving motor is set within the first frame, a lifting vehicle is set within the second frame, the driving motor drives the lifting vehicle to move up and down within the second frame, multiple first pulleys are set at a bottom of the frame unit and are able to slide on walking tracks which are set between two adjacent shelf units of the shelf system for driving the mobile vehicle to move between the two adjacent shelf units of the shelf system.

8 Claims, 5 Drawing Sheets

INTELLIGENT LIFTING SHUTTLE CARRIER STEREOSCOPIC WAREHOUSE FOR FLOAT GLASS

CROSS REFERENCE OF RELATED APPLICATION

The present invention claims priority under 35 U.S.C. 119(a-d) to CN 202410462303.9, filed Apr. 17, 2024.

BACKGROUND OF THE PRESENT INVENTION

Field of Invention

The present invention relates to the field of float glass production and manufacturing, and more particularly to an intelligent lifting shuttle carrier stereoscopic warehouse for float glass.

Description of Related Arts

Generally, there are many types and large quantities of float glass products in factories. Glass is a large-volume fragile product. The single-pack glass varies widely in size and weight, the size is mostly between 3660 mm×2440 mm and 2440 mm×1830 mm, and the weight is mostly between 2000 Kg and 3200 Kg, so that the float glass is relatively simple in storage mode. Therefore, the existing technology is unable to realize automatic stereoscopic storage of the float glass.

In addition to the problem that the automatic stereoscopic storage is unable to be realized, the traditional float glass storage is also difficult to achieve first-in-first-out and solve low inbound and outbound efficiencies. Due to the particularity of the storage shelf, the traditional float glass produced first is placed at the inner side of the storage shelf, and the traditional float glass produced later is placed at the outer side of the storage shelf, so that it is difficult for the float glass produced first to be taken out of the warehouse. As a result, the float glass produced first is only be able to be taken out of the warehouse by losing the inbound efficiency.

In the prior art, a Chinese patent, with an application No. CN202211669054.8, an application publication No. CN116011918 A, filed on Dec. 23, 2022, and titled as "An intelligent recommendation method based on a float glass warehouse", discloses an intelligent recommendation method based on a float glass warehouse. The method includes (step 1) obtaining location data and inventory data required by an inbound recommendation model, an outbound recommendation model and a daily transfer model, and performing feasible domain screening according to constraints; and (step 2) optimizing and recommending the outbound recommendation model and the inbound recommendation model in real time through greedy algorithm and discrete particle swarm optimization algorithm respectively, wherein (step 2) includes (step 2.1) initializing the discrete particle swarm optimization algorithm of the outbound recommendation model; (step 2.2) making the three models meet four common targets, wherein each model satisfies its own specific targets according to its business; (step 2.3) calculating a target value of each target according to the feasible domain, wherein each target that needs to be normalized is normalized according to the distribution, empowering each target according to an actual situation of the warehouse, and calculating a fitness value according to a way of weighted combination; and (step 2.4) iterating to obtain a final recommendation result. This method is able to reduce the dead inventory, improve the inbound and outbound efficiencies, and liberate the on-site personnel.

The prior art disclosed above is an intelligent recommendation method based on the float glass warehouse, which is able to improve the inbound and outbound efficiencies through algorithms in the background and reduce the dead inventory. For the actual operation of the inbound, outbound and transfer, the prior art disclosed above is unable to solve the problem that the glass produced first is placed at the inner side of the storage shelf, and the glass produced later is placed at the outer side of the storage shelf, so that it is difficult for the float glass produced first to be taken out of the warehouse, and the glass produced first is only be able to be taken out of the warehouse by losing the inbound efficiency. Moreover, the prior art disclosed above is unable to solve the problem that in the case of limited land area, how to effectively increase storage capacity, three-dimensional storage, and automatic management.

Aiming at the shortcomings of the prior art, the present invention is proposed.

SUMMARY OF THE PRESENT INVENTION

In order to overcome the shortcomings of the prior art, the present invention provides an intelligent lifting shuttle carrier stereoscopic warehouse for float glass, which is able to achieve the first-in-first-out of glass products without losing the inbound and outbound efficiencies, and to automatically complete all processes, thus saving personnel cost and management cost.

The present invention provides technical solutions as follows.

An intelligent lifting shuttle carrier stereoscopic warehouse for float glass comprises an inbound rotary table, a lifting shuttle carrier system, a shelf system, an outbound rotary table and a stereoscopic warehouse management system, wherein:

a quick response (RS) code of the float glass is automatically scanned to identify information of the float glass to be stored in the stereoscopic warehouse, an accuracy of the information is verified through shape detection data and weight detection data before storage, and after the information is ensured to be correct, an appropriate storage space is automatically allocated by the stereoscopic warehouse management system according to storage rules;

by executing an inbound instruction from the stereoscopic warehouse management system in conjunction with the lifting shuttle carrier system, the inbound rotary table drives the float glass to a designated position of the shelf system;

by executing an outbound instruction from the stereoscopic warehouse management system in conjunction with the lifting shuttle carrier system, the outbound rotary table sends the float glass to an exit of the stereoscopic warehouse or directly load the float glass to the lifting shuttle carrier system for delivery;

the lifting shuttle carrier system comprises a mobile vehicle, the mobile vehicle comprises a frame unit, the frame unit comprise a first frame and a second frame, a driving motor is set within the first frame, a lifting vehicle is set within the second frame, the driving motor drives the lifting vehicle to move up and down within the second frame, multiple first pulleys are set at a bottom of the frame unit and are able to slide on walking tracks which are set between two adjacent shelf units of the shelf system for driving the mobile vehicle to move between the two adjacent shelf units of the shelf system;

the lifting vehicle comprises multiple hanger tracks and a track frame for supporting the hanger tracks;

a hanger vehicle is set within the lifting vehicle, multiple second pulleys which are able to slide along the hanger tracks are set at an upper portion of the hanger vehicle, the second pulleys are set within multiple pulley frames, two adjacent pulley frames are connected through a connection rod, a material frame for accommodating the float glass is connected with the connection rod;

the material frame comprises an upright stanchion vertically connected with the connection rod, a support plate which is set at a lower end of the upright stanchion for supporting the float glass, and a baffle which is set at an upper end of the upright stanchion for blocking the float glass to avoid tipping;

the shelf system comprises one to three layers of shelves, a top portion of each layer of shelves is provided with a shelf track which is parallel to the hanger tracks.

An operational process is described as follows. After receiving an instruction, the hanger vehicle returns to the storage area of the shelf system through the shelf tracks, or returns to the lifting vehicle, the lifting vehicle is able to transport the hanger vehicle to different storage areas of one to three layers of shelves of the shelf system by lifting, and to cooperate with the mobile vehicle to walk horizontally along the walking tracks, so that the lifting vehicle and the hanger vehicle are able to be transported to any storage area of the shelf system, thereby completing the inbound and outbound work.

Preferably, the baffle is electrically-driven reversible.

Preferably, a strengthening inclined rod is set at the upper end of the upright stanchion, and the baffle is installed on the strengthening inclined rod.

Preferably, the inbound rotary table has a feeding area for the float glass and a warehousing area for the float glass, wherein the feeding area is defined by an outward semicircle, and the warehousing area is defined by an inward semicircle.

The present invention has some beneficial effects as follows.

(1) The present invention is able to realize multi-layer three-dimensional storage of the whole package of float glass with large load (3 T to 4 T), which greatly improves the space utilization of the warehouse.

(2) The present invention is able to adapt to the automatic storage of float glass products of different specifications, and has a wide application range.

(3) The present invention is able to achieve the first-in-first-out of float glass products without losing the inbound and outbound efficiencies, and automatically complete all processes, which greatly saves personnel cost and management cost.

DETAILED DESCRIPTION OF THE PREFERRED EMBODIMENT

The present invention will be further described clearly and completely with reference to the accompanying drawings and embodiments as follows. Obviously, the embodiments described herein are only part of the embodiments of the present invention, and are not all embodiments. Based on the embodiments of the present invention, all other embodiments obtained by those skilled in the art without creative labour are within the protective scope of the present invention.

Figure 1:
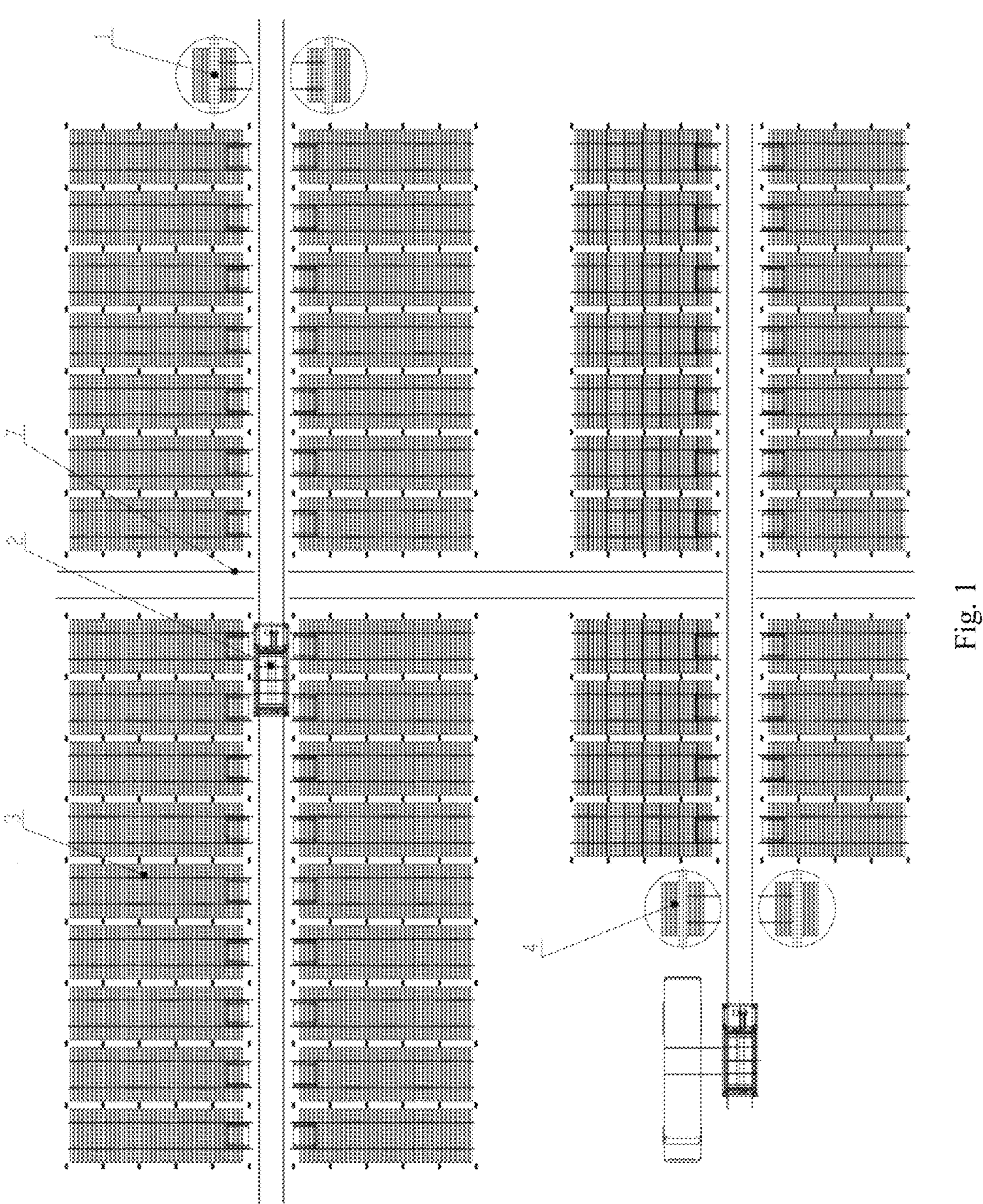
FIG. 1 is an overall schematic diagram of an intelligent lifting shuttle carrier stereoscopic warehouse for float glass provided by the present invention.
Figure 2:
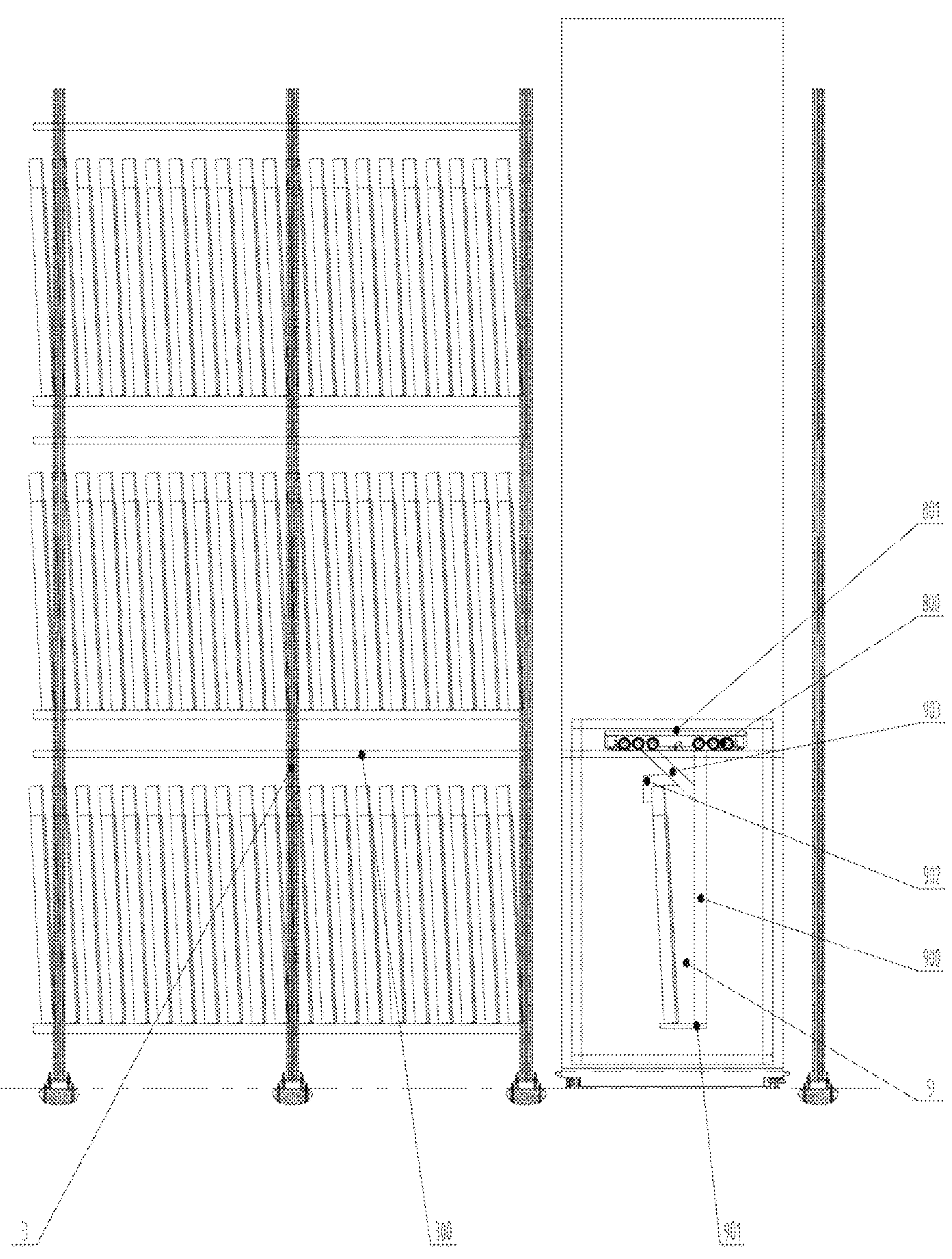
FIG. 2 shows the cooperation between a lifting shuttle carrier system and a shelf system of the stereoscopic warehouse.
Figure 3:
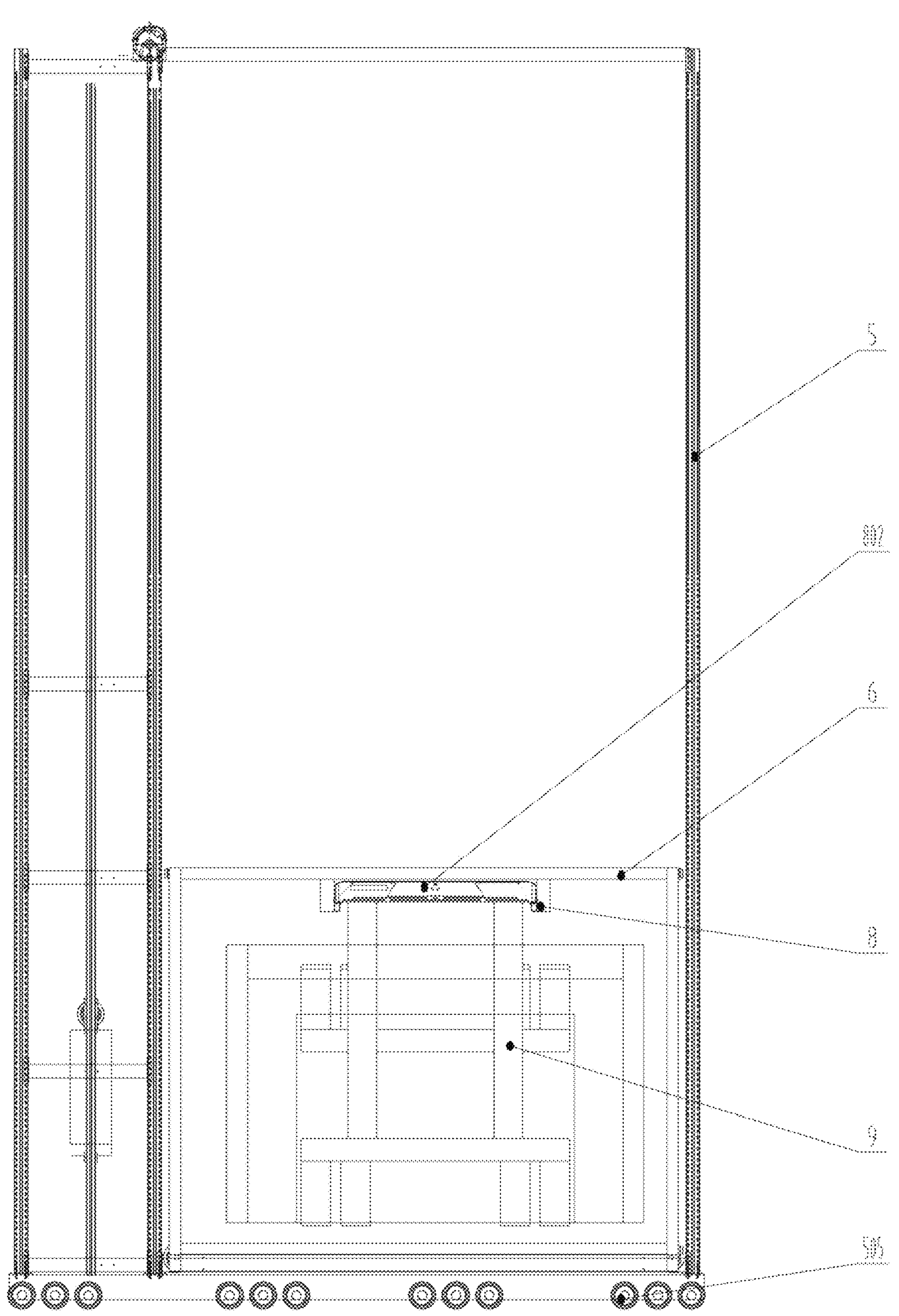
FIG. 3 is a structurally schematic diagram of the lifting shuttle carrier system.
Figure 4:
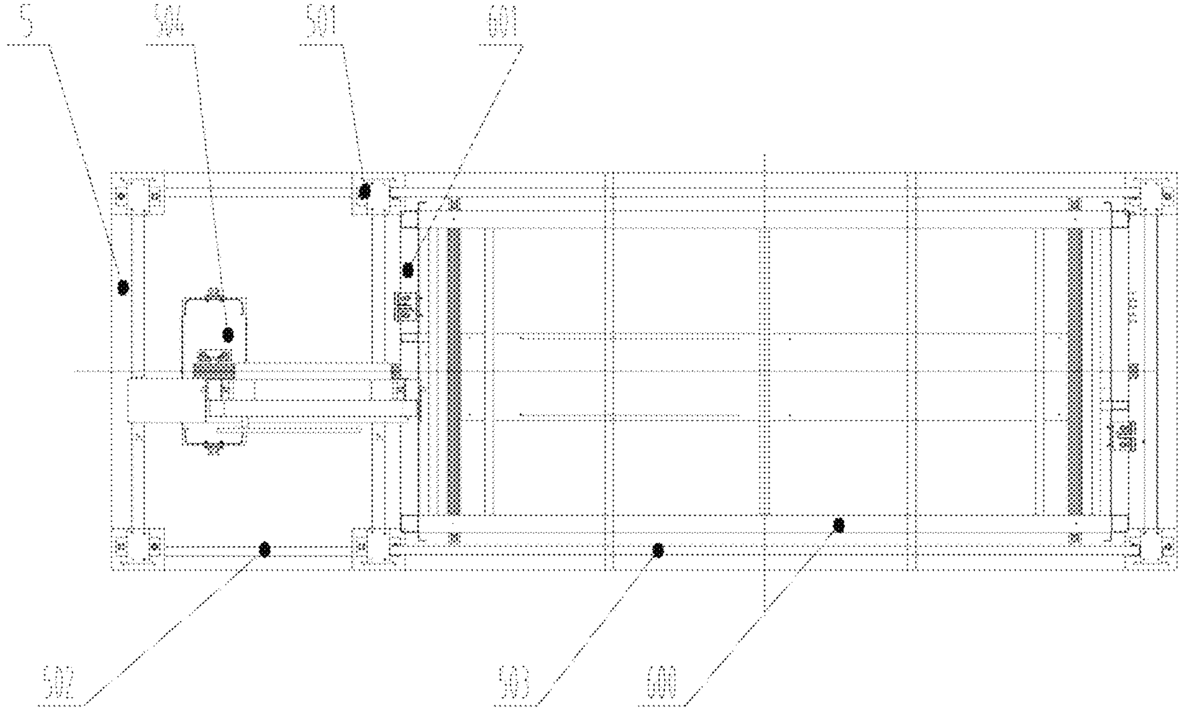
FIG. 4 is a top view of the lifting shuttle carrier system shown in FIG. 3.
Figure 5:
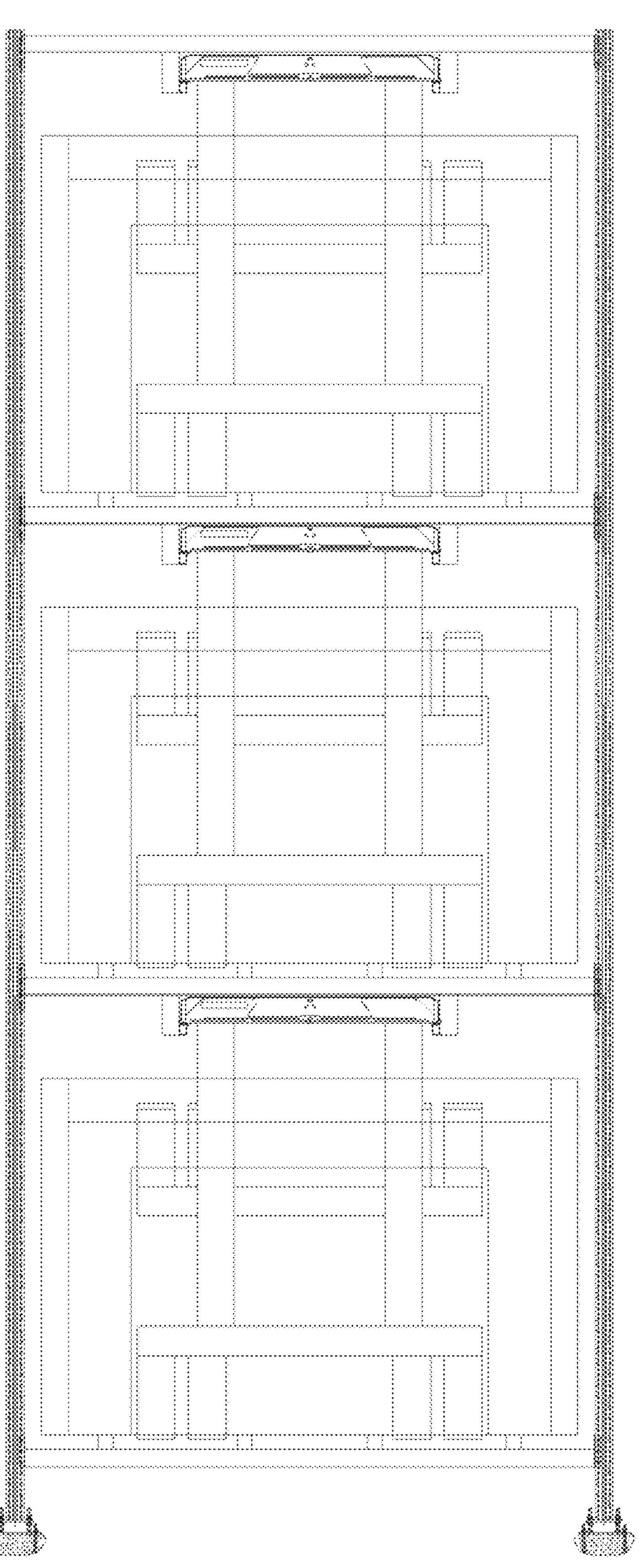
FIG. 5 shows the lifting of a hanger vehicle of the lifting shuttle carrier system.

FIG. 1 is an overall schematic diagram of an intelligent lifting shuttle carrier stereoscopic warehouse for float glass provided by the present invention. FIG. 2 shows the cooperation between a lifting shuttle carrier system and a shelf system of the stereoscopic warehouse. FIG. 3 is a structurally schematic diagram of the lifting shuttle carrier system. FIG. 4 is a top view of the lifting shuttle carrier system shown in FIG. 3. FIG. 5 shows the lifting of a hanger vehicle of the lifting shuttle carrier system.

Referring to FIGS. 1 to 5, an intelligent lifting shuttle carrier stereoscopic warehouse for float glass comprises an inbound rotary table 1, a lifting shuttle carrier system 2, a shelf system 3, an outbound rotary table 4 and a stereoscopic warehouse management system, wherein:

a quick response (RS) code of the float glass is automatically scanned to identify information of the float glass to be stored in the stereoscopic warehouse, an accuracy of the information is verified through shape detection data and weight detection data before storage, and after the information is ensured to be correct, an appropriate storage space is automatically allocated by the stereoscopic warehouse management system according to storage rules;

by executing an inbound instruction from the stereoscopic warehouse management system in conjunction with the lifting shuttle carrier system 2, the inbound rotary table 1 drives the float glass to a designated position of the shelf system 3;

by executing an outbound instruction from the stereoscopic warehouse management system in conjunction with the lifting shuttle carrier system 2, the outbound rotary table 4 sends the float glass to an exit of the stereoscopic warehouse or directly load the float glass to the lifting shuttle carrier system 2 for delivery;

the lifting shuttle carrier system 2 comprises a mobile vehicle 5, the mobile vehicle 5 comprises a frame unit 501, the frame unit 501 comprise a first frame 502 and a second frame 503, a driving motor 504 is set within the first frame 501, a lifting vehicle 6 is set within the second frame 503, the driving motor 504 drives the lifting vehicle 6 to move up and down within the second frame 503, multiple first pulleys 505 are set at a bottom of the frame unit 501 and are able to slide on walking tracks 7 which are set between two adjacent shelf units of the shelf system 3 for driving the mobile vehicle 5 to move between the two adjacent shelf units of the shelf system 3;

the lifting vehicle 6 comprises multiple hanger tracks 600 and a track frame 601 for supporting the hanger tracks 600;

a hanger vehicle 8 is set within the lifting vehicle 6, multiple second pulleys 800 which are able to slide along the hanger tracks 600 are set at an upper portion of the hanger vehicle 8, the second pulleys 800 are set within multiple pulley frames 801, two adjacent pulley frames are connected through a connection rod 802, a material frame 9 for accommodating the float glass is connected with the connection rod 802;

the material frame 9 comprises an upright stanchion 900 vertically connected with the connection rod 802, a support plate 901 which is set at a lower end of the upright stanchion 900 for supporting the float glass, a baffle 902 which is set at an upper end of the upright stanchion 900 for blocking the float glass to avoid tipping, wherein the baffle 902 is electrically-driven reversible, and a strengthening inclined rod 903 which is set at the upper end of the upright stanchion 900, wherein the baffle 902 is installed on the strengthening inclined rod 903;

the shelf system 3 comprises one to three layers of shelves, a top portion of each layer of shelves is provided with a shelf track 300 which is parallel to the hanger tracks 600.

The inbound rotary table 1 has a feeding area for the float glass and a warehousing area for the float glass, wherein the feeding area is defined by an outward semicircle, and the warehousing area is defined by an inward semicircle.

An operational process is described as follows. After receiving an instruction, the hanger vehicle 8 returns to the storage area of the shelf system 3 through the shelf track 300, or returns to the lifting vehicle 6, the lifting vehicle 6 is able to transport the hanger vehicle 8 to different storage areas of one to three layers of shelves of the shelf system 3 by lifting, and to cooperate with the mobile vehicle 5 to walk horizontally along the walking tracks 7, so that the lifting vehicle 6 and the hanger vehicle 8 are able to be transported to any storage area of the shelf system 3, thereby completing the inbound and outbound work.

The embodiment described above is only a part of the embodiment of the present invention, and not all embodiments. Based on the embodiment provided by the present invention, all other embodiments obtained by those skilled in the art without making creative labor fall within the protective scope of the present invention.

What is claimed is:

1. An intelligent lifting shuttle carrier stereoscopic warehouse for float glass, the stereoscopic warehouse comprising an inbound rotary table, a lifting shuttle carrier system, a shelf system, an outbound rotary table and a stereoscopic warehouse management system, wherein:

a quick response (RS) code of the float glass is automatically scanned to identify information of the float glass to be stored in the stereoscopic warehouse, an accuracy of the information is verified through shape detection data and weight detection data before storage, and after the information is ensured to be correct, an appropriate storage space is automatically allocated by the stereoscopic warehouse management system according to storage rules;

by executing an inbound instruction from the stereoscopic warehouse management system in conjunction with the lifting shuttle carrier system, the inbound rotary table drives the float glass to a designated position of the shelf system;

by executing an outbound instruction from the stereoscopic warehouse management system in conjunction with the lifting shuttle carrier system, the outbound rotary table sends the float glass to an exit of the stereoscopic warehouse or directly load the float glass to the lifting shuttle carrier system for delivery;

the lifting shuttle carrier system comprises a mobile vehicle, the mobile vehicle comprises a frame unit, the frame unit comprise a first frame and a second frame, a driving motor is set within the first frame, a lifting vehicle is set within the second frame, the driving motor drives the lifting vehicle to move up and down within the second frame, multiple first pulleys are set at a bottom of the frame unit and are able to slide on walking tracks which are set between two adjacent shelf units of the shelf system for driving the mobile vehicle to move between the two adjacent shelf units of the shelf system;

the lifting vehicle comprises multiple hanger tracks and a track frame for supporting the hanger tracks;

a hanger vehicle is set within the lifting vehicle, multiple second pulleys which are able to slide along the hanger tracks are set at an upper portion of the hanger vehicle, the second pulleys are set within multiple pulley frames, two adjacent pulley frames are connected through a connection rod, a material frame for accommodating the float glass is connected with the connection rod;

the material frame comprises an upright stanchion vertically connected with the connection rod, a support plate which is set at a lower end of the upright stanchion for supporting the float glass, and a baffle which is set at an upper end of the upright stanchion for blocking the float glass to avoid tipping;

the shelf system comprises one to three layers of shelves, a top portion of each layer of shelves is provided with a shelf track which is parallel to the hanger tracks;

whereby after receiving an instruction, the hanger vehicle returns to the storage area of the shelf system through the shelf tracks, or returns to the lifting vehicle, the lifting vehicle is able to transport the hanger vehicle to different storage areas of one to three layers of shelves of the shelf system by lifting, and to cooperate with the mobile vehicle to walk horizontally along the walking tracks, so that the lifting vehicle and the hanger vehicle are able to be transported to any storage area of the shelf system for completing inbound and outbound work.

2. The intelligent lifting shuttle carrier stereoscopic warehouse according to claim 1, wherein the baffle is electrically-driven reversible.

3. The intelligent lifting shuttle carrier stereoscopic warehouse according to claim 1, wherein a strengthening inclined rod is set at the upper end of the upright stanchion, and the baffle is installed on the strengthening inclined rod.

4. The intelligent lifting shuttle carrier stereoscopic warehouse according to claim 2, wherein a strengthening inclined rod is set at the upper end of the upright stanchion, and the baffle is installed on the strengthening inclined rod.

5. The intelligent lifting shuttle carrier stereoscopic warehouse according to claim 1, wherein the inbound rotary table has a feeding area for the float glass and a warehousing area for the float glass, wherein the feeding area is defined by an outward semicircle, and the warehousing area is defined by an inward semicircle.

6. The intelligent lifting shuttle carrier stereoscopic warehouse according to claim 2, wherein the inbound rotary table has a feeding area for the float glass and a warehousing area for the float glass, wherein the feeding area is defined by an outward semicircle, and the warehousing area is defined by an inward semicircle.

7. The intelligent lifting shuttle carrier stereoscopic warehouse according to claim 3, wherein the inbound rotary table has a feeding area for the float glass and a warehousing area for the float glass, wherein the feeding area is defined by an outward semicircle, and the warehousing area is defined by an inward semicircle.

8. The intelligent lifting shuttle carrier stereoscopic warehouse according to claim 4, wherein the inbound rotary table has a feeding area for the float glass and a warehousing area for the float glass, wherein the feeding area is defined by an outward semicircle, and the warehousing area is defined by an inward semicircle.

* * * * *